Aug. 24, 1954  C. R. GLEASON  2,687,026
DISH COVER
Filed March 24, 1949
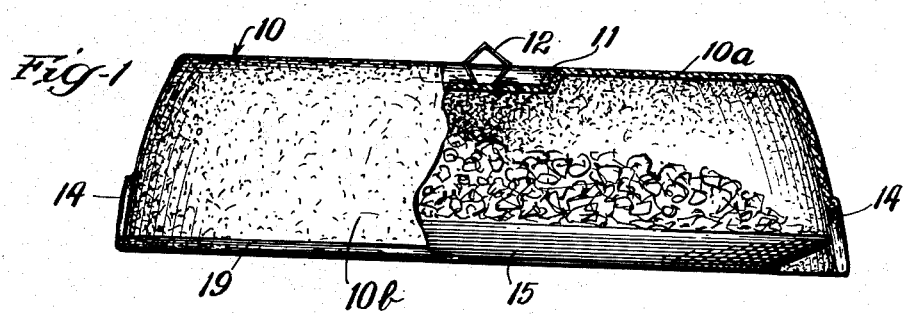
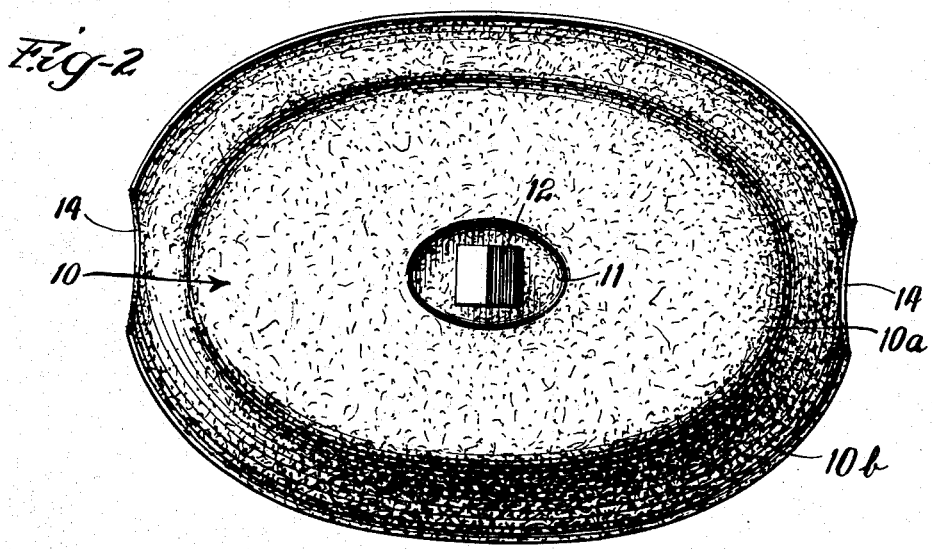
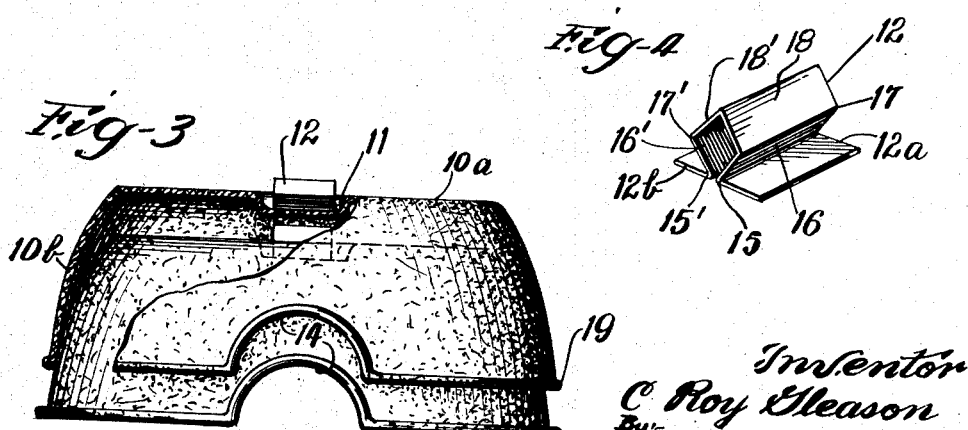
Inventor
C. Roy Gleason
By:-
Charles K. Wooden
agent.

Patented Aug. 24, 1954

2,687,026

UNITED STATES PATENT OFFICE 2,687,026

DISH COVER

C. Roy Gleason, Chicago, Ill.

Application March 24, 1949, Serial No. 83,235

1 Claim. (Cl. 65—16)

This invention relates to dish covers such as used for covering food served in restaurants, in hotels for room service, hospitals and other places where food must be served at some distance from the kitchen. Conventional metal bell-like food covers are commonly used and are well, if not favorably, known in the art.

Metal covers are objectionable on many grounds:

(a) Heat conduction. They pick up and radiate heat, thus cooling the food, particularly in air conditioned rooms.

(b) Condense food vapors and drip the condensate objectionably. That is one reason why toast is covered with a napkin under the cover— often the cover is left off.

(c) They soon become dented and scratched and, therefore, unsanitary.

(d) High cost. It is not alone the original cost but the cost of replacements. Dish covers are favored souvenirs and mysterious disappearances add to the cost. When one considers that silver plated dish covers cost as high or more than $20.00 each, this cost factor becomes important.

(e) Heavy and awkward. Silver dish covers are supposed to be very decorative on a tray. However, with their protruding handles, they consume excessive tray area which make them very objectionable in general use.

The particular object of the present invention is to provide a low cost, lightweight dish cover made of paper pulp or the like that may be economically utilized in a one time service.

Another object is to provide a dish cover of high insulation and vapor absorption characteristics. The absorption characteristic is highly important and therein resides one of the chief objects of the invention.

A further object is to provide a dish cover of low cost that may be effectively telescoped, packed, shipped and stored in a small space and kept in a sanitary condition.

And a still further object is to provide a dish cover of various shapes to fit all shapes of dishes and having a telescoping top, preferably flat with a retractable top handle to permit stacking other dishes or the like on the cover so that the tray area may be more effectively utilized.

Other objects and benefits will be disclosed in the following descriptions and drawings in which Fig. 1 is a side elevational view of my dish cover partly broken away and in cross section showing the cover applied over a food carrying dish;

Fig. 2 is a plan view of the cover shown in Fig. 1;

Fig. 3 is an end elevational view showing a pair of dish covers telescoped with the upper cover broken away and in section; and Fig. 4 is a perspective view of the retractable handle used in combination with the dish cover.

In referring now to the drawing which illustrates a preferred form of this invention and in which similar reference numerals refer to similar features in the different views, there is shown an oval shaped cover 10 made of a suitable fibrous heat insulation material such as paper pulp. The material must have good absorption characteristic in order to prevent dripping of moisture. However, any other suitable material having similar characteristics may be used and the shape may be varied to cover various shaped dishes. This cover is preferably molded to provide a flat top 10a and a slightly flaring skirt 10b with a depression or oval recess 11 in the center of the flat top for a depressable and retractable handle 12 as will later more fully appear.

The skirt 10b is designed to fit over a dish and its contents and in order for an attendant to lift and carry a covered dish, the ends of the cover are provided with arcuate recesses 14 which extend from the lower edge of the cover as clearly shown in Fig. 3 and into which the fingers of the attendant can be inserted for grasping the dish. It will be noted that the cover is designed in the present instance to completely enshroud the dish 15.

The handle 12 is formed or bent from cardboard or similar material to provide oppositely extending attaching flanges 12a and 12b which can be glued or stitched into the oval recess 11 of the cover and in the general direction of the minor axis of said oval recess. The adjacent edges of the flanges 12a and 12b are creased as indicated at 15 and 15' respectively to provide diverging parts 16 and 16' which are creased as indicated at 17 and 17' to provide converging parts 18 and 18' which are integrally united at their tops, thus forming a toggle handle which can be automatically depressed and expanded into flattened relation along the major axis of the oval recess 11 of the cover when a second dish or cover is superposed thereon and which can be retracted for lifting the cover from the dish.

For strengthening purposes and to conserve the proper shape, the skirt of the cover is provided with a bead 19 at its lower edge. In the present instance, the skirt slopes or flares slightly from the top 10a so it can tightly embrace the edge of a dish as shown in Fig. 1.

In forming such covers, I propose to use a section in my cover of approximately one-eighth of an inch with a one-eighth of an inch bead, although the dimensions may be varied in accordance with the pulp material used. Obviously, various forms of covers may be provided to fit different shapes of dishes. My object is to provide a one use dish cover and I propose to use any type of pulp-like material that has the desired qualities including absorption and sanitary qualities. I intend to use a clean absorbent pulp material with a minimum of sizing and fillers to provide high insulation qualities to prevent the radiation of heat as well as good absorption qualities that gather and hold vapor moisture without objectionable dripping. Naturally, I have a wide variety of fibrous pulp-like material to choose from. The selection as heretofore indicated will determine their adaptability to my purpose. It will be understood that I propose to use a one time cover and naturally the cost factor will be decisive. The forming of the cover from pulp materials is a rapid low cost process and it will be understood that I will provide proper clearances in the forming moulds and tools to make the cover in a rapid and economic manner.

In designing these covers with a flat top instead of a dome top (although I may prefer for some uses dome top designs) the dishes or platters may be stacked on top of one another to utilize the tray area to the best advantage, the handles 12 being automatically depressed during the stacking operation. It will be recognized that such a cover cannot have a molded or protruding knob or handle on the top and, therefore, a retractable handle attached to a recess in the top of the cover is provided so that it will not interfere with its proper use as above outlined. It will also be understood that these covers must be nested or stacked in a compact and sanitary manner for shipment and, therefore, I have provided a form that can be closely nested so that the covers may be completely protected and the inside of the covers maintained in a sanitary manner as shown in Fig. 3. This not only provides means for storage of the covers when not in use but also after the covers are used.

It will be understood that the combination of pulp used in my covers will carry a minimum of sizing and fillers so as not to prevent rapid absorption and that no unsanitary factors may be introduced. It will be appreciated that with the absorption qualities of the covers that these sizing and fillers may become objectionable and, therefore, my determination of minimum qualities, sizing and fillers is necessary for their effective used. In general, I contemplate a proper set up of equipment which will permit the covers to be made at a minimum of cost. With the high cost of labor now extant it will be understood that my covers reduce the overall cost of their use while permitting their sale at a satisfactory manufacturing profit.

Having thus explained my invention, I now claim as new:

An enclosure unit arranged for deep nesting with like units with minimum clearance requirements therebetween and to cover a food dish, comprising a rigid fibrous shell constructed throughout of heat insulating and moisture absorbing material, said shell having a generally vertically disposed curved side forming skirt and a continuous flat closed top, said top having an inward finger receiving depression therein, and a collapsible handle secured at the bottom of the depression, said handle comprising adjacently positioned feet, upwardly and outwardly diverging sides extending from said feet and converging sides continuing from said diverging sides, said converging sides joining in an apex disposed outwardly of said depression and above the plane of said closed top, said handle being collapsible into said depression to dispose said handle apex beneath the plane of said closed top during nesting of said units or while in dish covering position.

References Cited in the file of this patent

UNITED STATES PATENTS

| Number | Name | Date |
| --- | --- | --- |
| D. 31,464 | Hinoult | Aug. 29, 1899 |
| 700,764 | Hardy | May 27, 1902 |
| 797,314 | Owens | Aug. 15, 1905 |
| 932,774 | Foster | Aug. 31, 1909 |
| 1,110,945 | Kinsman | Sept. 15, 1914 |
| 1,380,303 | Rogers | May 31, 1921 |
| 1,402,692 | Van Orsdale | Jan. 3, 1922 |
| 1,470,763 | Richards | Oct. 16, 1923 |
| 1,627,042 | Mason et al. | May 3, 1927 |
| 1,655,597 | Devine | Jan. 10, 1928 |
| 1,790,299 | Foreman | Jan. 27, 1931 |
| 1,938,909 | Huff | Dec. 12, 1933 |
| 1,973,449 | Tighe, Jr. | Sept. 11, 1934 |
| 1,999,878 | La Bombard | Apr. 30, 1935 |
| 2,147,471 | Tyrrell et al. | Feb. 14, 1939 |
| 2,346,631 | Wille | Apr. 11, 1944 |

FOREIGN PATENTS

| Number | Country | Date |
| --- | --- | --- |
| 5,360 | Britain | Apr. 17, 1886 |
| 14,488 | Britain | Nov. 26, 1885 |